United States Patent [19]

Hiroyasu

[11] Patent Number: 4,665,430
[45] Date of Patent: May 12, 1987

[54] MONITORING APPARATUS

[75] Inventor: Mamoru Hiroyasu, Saijo, Japan

[73] Assignee: Matsushita Electric Industrial Co., Ltd, Osaka, Japan

[21] Appl. No.: 691,703

[22] Filed: Jan. 15, 1985

[30] Foreign Application Priority Data

Jan. 20, 1984 [JP] Japan .................................. 59-8762
Feb. 23, 1984 [JP] Japan .................................. 59-33418
Nov. 20, 1984 [JP] Japan .................................. 59-245217

[51] Int. Cl.4 ........................ H04N 7/00; H04N 7/18; H04N 5/30
[52] U.S. Cl. ..................................... 358/108; 358/87; 358/210; 350/540
[58] Field of Search ........................ 358/87, 108, 210; 350/540, 541; 354/81

[56] References Cited

U.S. PATENT DOCUMENTS 3,689,695  9/1972  Rosenfield et al. ................ 358/108
4,320,949  3/1982  Pagano .............................. 358/108
4,369,467  1/1983  Smith ................................ 358/210
4,499,490  2/1985  Morgan ............................. 358/87

Primary Examiner—James J. Groody
Assistant Examiner—John K. Peng
Attorney, Agent, or Firm—Wenderoth, Lind & Ponack

[57] ABSTRACT

A monitoring apparatus comprising a lens structure includes lenses and a reflector element which reflects the light rays passing through these lenses, thereby changing the first optical axis along which the light rays pass before being reflected into the second optical axis and which is further equipped with a camera element for taking the picture image of the object body which has been reflected from the reflector element and a drive for rotating the lens structure, with this second optical axis extending along its center, to enable monitoring of a wide field of vision.

2 Claims, 12 Drawing Figures

MONITORING APPARATUS

BACKGROUND OF THE INVENTION

Industrial Application Field

The present invention relates to a monitoring apparatus which enables monitoring over a wide range, as used for rearward monitoring of motor cars, etc.

Prior Art

Generally, when monitoring over a wide range with a monitoring camera such as a television camera, etc., the camera unit including its lenses is made rotatable, with its direction controlled by means of a drive including a motor, etc. Because the camera unit is heavy, a large amount of driving power is required for the motor, etc. A method for rotating the lenses only is known, but when the lens structure includes a reflector element, the method involves an undesired inconvenience in that the image on the television screen also rotates.

Furthermore, when this apparatus is used for monitoring of the rear space of a motor car, etc., or the outside of a building, etc., a large case is required for protecting the camera unit containing lenses from weathering. Besides, the camera unit, by being installed outside a car or building, is poorly protected from crime.

Object of the Invention

The present invention has as its object getting rid of the aforementioned disadvantages, thereby providing a television camera which enables obtaining a wide range of field of vision by making use of a simple construction.

It is a further object of this invention to provide a monitoring apparatus equipped with a control device which always enables the specified erect picture image to be obtained over a wide field of vision.

BRIEF OF THE INVENTION

In the monitoring apparatus of this invention equipped with lenses, a reflector element is provided for reflecting the light rays passing through these lenses and a camera element is provided for taking the picture image of the object body, into which the light rays reflected from this reflector element come. A angle is formed between the first optical axis at the forward part of the reflector element and the second optical axis at the backward part and the lenses and the reflector element are rotated, with this second optical axis extending along the center of rotation.

In that way, the rotation may be effected by a small driving power and when monitoring the circumference of a car or building, etc., it is only proper to bring outside at least the lens structure only. This not only makes for a better design, but permits the use of a small and simple weathering case and is very effective where prevention of crime is concerned.

Furthermore, according to this invention, the lenses, the reflector element and the camera element are an integral unit designed to be rotated by a drive utilizing a motor, etc., with the second optical axis at the rear of the reflector element extending along the center of rotation.

This design requires a smaller driving power than that for turning the whole camera and thus the picture image on the television screen will not rotate, because the lenses, the reflector element and the camera element are integrated.

Furthermore, the monitoring apparatus of this invention adopts a structure having a rotatable lens structure and a position detecting means for detecting the rotational position of the lens structure and a control means for for obtaining the erect picture image by switching the output signals from the camera element in response to the deflection signal produced by the position detecting means.

With this construction, the position detecting means, upon detecting the position where the lens structure stops to rotate, as it is engaged with the mechanism for rotating the lens structure, produces a detection signal corresponding to the stopped position. The control means for obtaining the erect image at the specified position, upon receiving the detection signal from the position detecting means, is coupled to either a camera element for converting the light rays from the lens structure into the picture image signals or a picture image display for converting the picture image signals into the picture image, thereby exercising an action for getting the erect image at that position through one of the above-mentioned coupling parts in response to the signal from the position detecting means.

DESCRIPTION OF THE PREFERRED EMBODIMENTS

Figure 1:
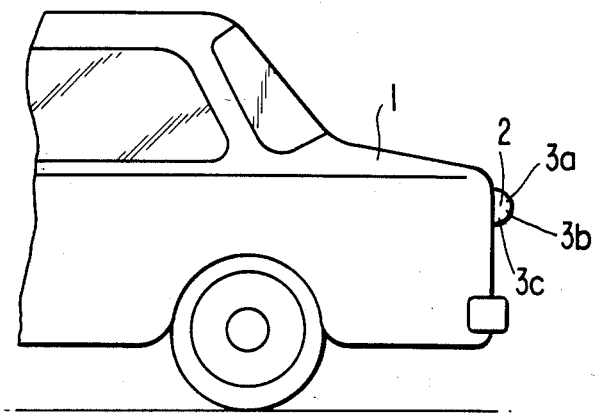
FIG. 1 is a side view of a motor car on which the monitoring apparatus embodying this invention is mounted.

In the following, embodiments of this invention are described with reference to the accompanying drawings: FIG. 1 represents its application to a motor car, showing a side view of the rear part of the car.

In this apparatus, a camera is located at the upper rear part of the car 1, with the camera unit installed in the interior of the car and the transparent lens weatherproofing case 2 only exposed outside. The front group lenses' optical axes extend in the direction of 3b. The direction of 3b is at 45 degrees downward from the horizontal direction 3a and rearward of the car. In this arrangement, the visible range is from 3a to 3c. The lens structure is rotatable about axis 3a.

Figure 2:
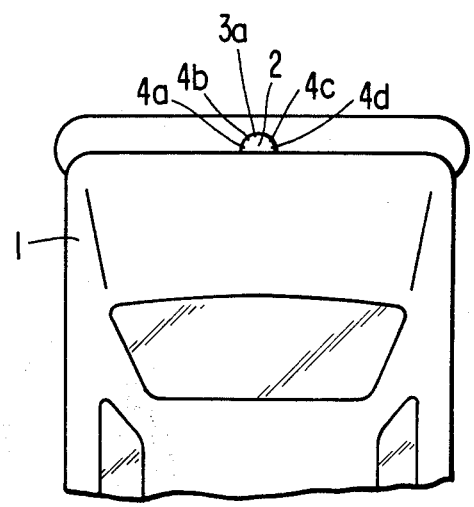
FIG. 2 is a plan view of the embodiment shown in FIG. 1.

FIG. 2 is a plan view of the rear part of the car. When the lens structure is turned 90 degrees rightward toward 4d with 3a as its axis of rotation, the front group lenses are in the direction of 4c. In this state, the visible range is from 3a to 4d.

When conversely, the lens structure is turned 90 degrees leftward toward 4a, the front group lenses are in the direction of 4b. In this state, the visible range is from 3a to 4a. In this way, a wider range is made observable by turning the lens structure about axis 3a.

Figure 3:
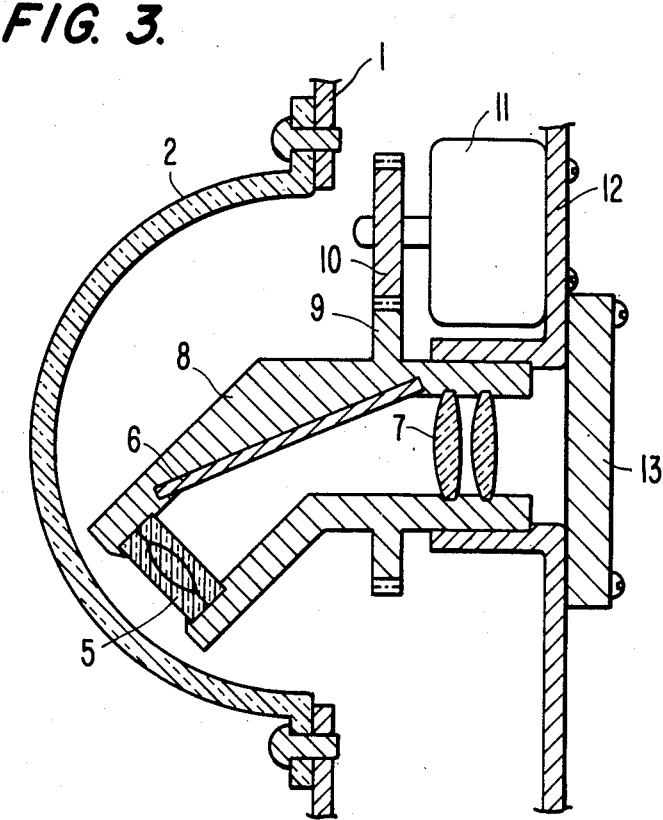
FIG. 3 is a sectional view of the monitoring apparatus.

FIG. 3 is a sectional view of the camera part containing the lens structure. Behind the front group lenses 5, there are arranged a reflector element (hereinafter called mirror) 6, which reflects at 45 degrees the light rays which have passed through the lenses, and rear group lenses 7; the front group lenses 5, the mirror 6 and the rear group lenses 7 are set in a cylinder 8. On the cylinder 8 a gear 9 is provided and another gear 10 is securely mounted on a rotary shaft of a motor 11. The motor 11 is fixed on a bracket 12 held in the car 1 and the cylinder 8 is rotatably mounted on the bracket 12. Gears 9 and 10 are engaged with each other, so that the rotation of the motor 11 is transmitted to the cylinder 8, and the cylinder 8 is thereby rotated relative to the bracket 12. Numeral 13 designates a camera element.

The aforementioned embodiment illustrates an application on a motor car, but to be sure, it may be effectively used as a lens structure of a crime prevention camera for monitoring of the cirumference of a building, etc. While in the aforementioned embodiment, the whole entire lens structure containing the rear group lenses is rotated as a unitary body, many alternatives are, of course, feasible, such as integrating the front group lenses and the mirror, integrating the front group lenses, the mirror and part of the rear group lenses or integrating the mirror and the rear group lenses, when the front group lenses are absent, etc.

Figure 4:
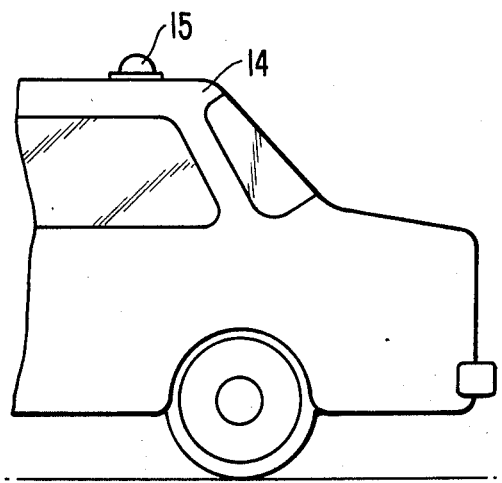
FIG. 4 is a side view of a motor car on which another monitoring apparatus embodying this invention is mounted.

In the following, another monitoring apparatus, a second embodiment of this invention, is described with reference to the attached drawings. FIG. 4 displays an embodiment as applied to a motor car, showing a side view of its rear part. A camera is installed on the roof of the rear part of the car, but the camera unit is located within the car, with only its transparent weather-proofing case 15 exposed outside it.

Figure 5:
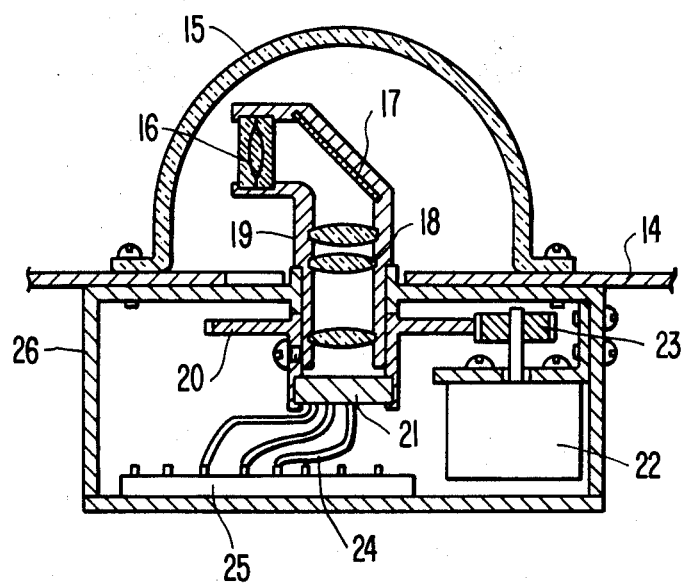
FIG. 5 is a sectional view of the monitoring apparatus of FIG. 4.

FIG. 5 is a sectional view of the monitoring apparatus of FIG. 4. At the rear of front group lenses 16, there are arranged a reflector element 17 which reflects light rays at about 90 degrees and rear group lenses 18; the front group lenses 16, reflector element 17 and the rear group lenses 18 are set in a cylinder 19. On the cylinder 19, a gear 20 is mounted and a camera element 21 is fixed to its bottom. On the rotary shaft of a motor 22, a gear 23 is fixed, gears 20 and 23 being engaged with each other. The rotational drive of the motor 22 is transmitted to the cylinder 19, to turn it together with the camera element 21. The camera element 21 is coupled by the electric circuit 25 with lead wires 24. Such lead wires 24 should be soft and long wires. It is possible to provide the cylinder 19 with limit switches, etc., to permit its rotation within an arbitrary range of angles. Numeral 26 designates a housing box.

Figure 6:
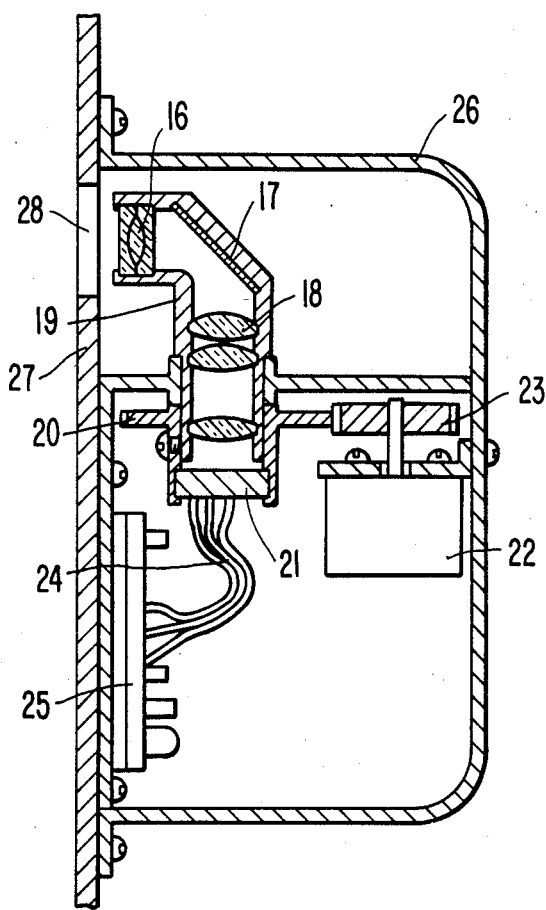
FIG. 6 is a sectional view of still another embodiment of a monitoring apparatus according to the present invention.

Still another embodiment is shown in FIG. 6. This illustrates its application on a door or a wall of a building, etc., showing a monitoring apparatus in a sectional view. The television camera is installed inside the door 27. The part of the door in front of the lenses is formed as a transparent window 28.

Figure 7:
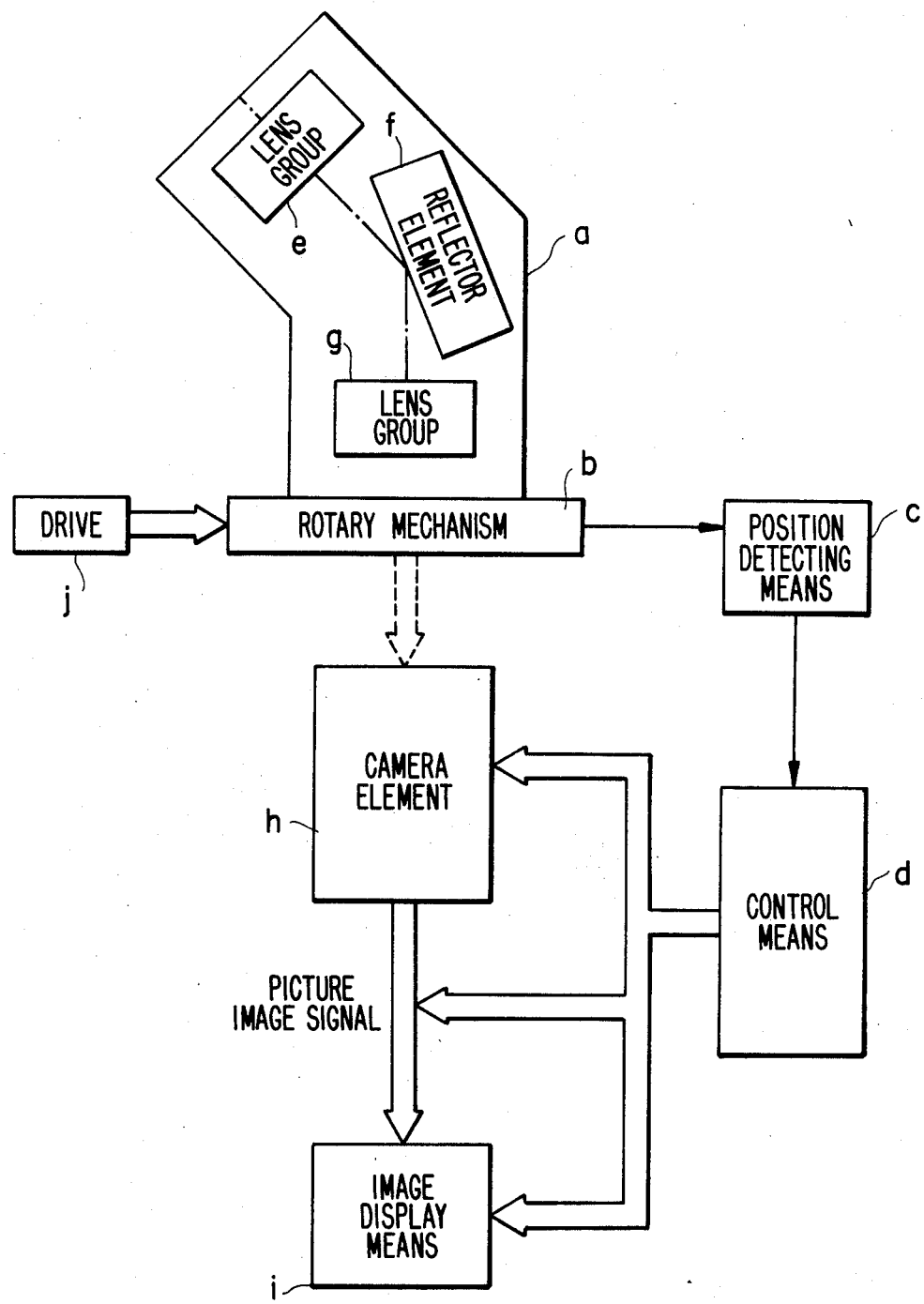
FIG. 7 is a block diagram of still another embodiment of a monitoring device according to the present invention.

Further, still different embodiments are described to the reference with attached drawings:

FIG. 7 is a block diagram representing the construction embodying this invention. The position detecting means c communicating with the rotary mechanism b for the lens structure a is a mechanical or electrical or optical detecting device or a combination of any of them, which works through the control means d to effect a switching so as to have correct picture image. Other elements such as lens group e, reflector element f, lens group g, camera element h, picture image display i and drive j and their functions are as described hereinbefore.

Figure 8:
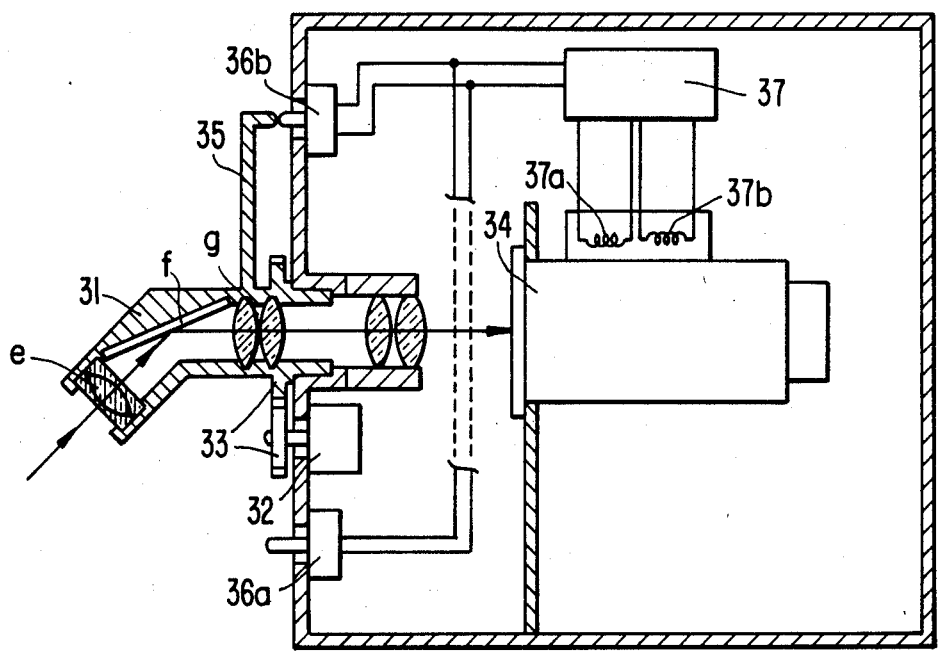
FIG. 8 is a sectional view of the monitoring apparatus.
Figure 9:
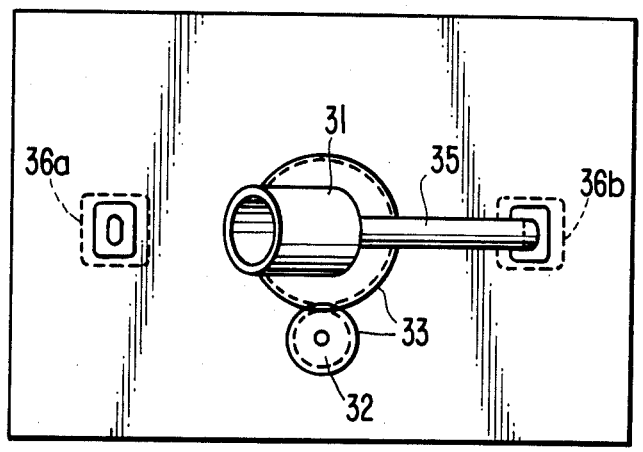
FIG. 9 is a side view of the monitoring apparatus.

FIGS. 8–9 show an embodiment in which the aforementioned component elements are actually employed, the elements of FIG. 7 respectively corresponding to the following parts in FIGS. 8–9. The lens structure 31 including the lens group e, reflector element f and lens group g is similar to that of the above-mentioned one. Use is made of a motor 32 as the drive j, a gear mechanism 33 as the rotary mechanism b, a camera tube 34 as the camera element h, an arm 35 and microswitches 36a and 36b as the position detecting means c, and a relay for effecting a polarity converting operation of the vertical and the horizontal deflection circuits 37a and 37b of the camera tube 34 (hereinafter referred to as relay) as the control means d.

Figure 10:
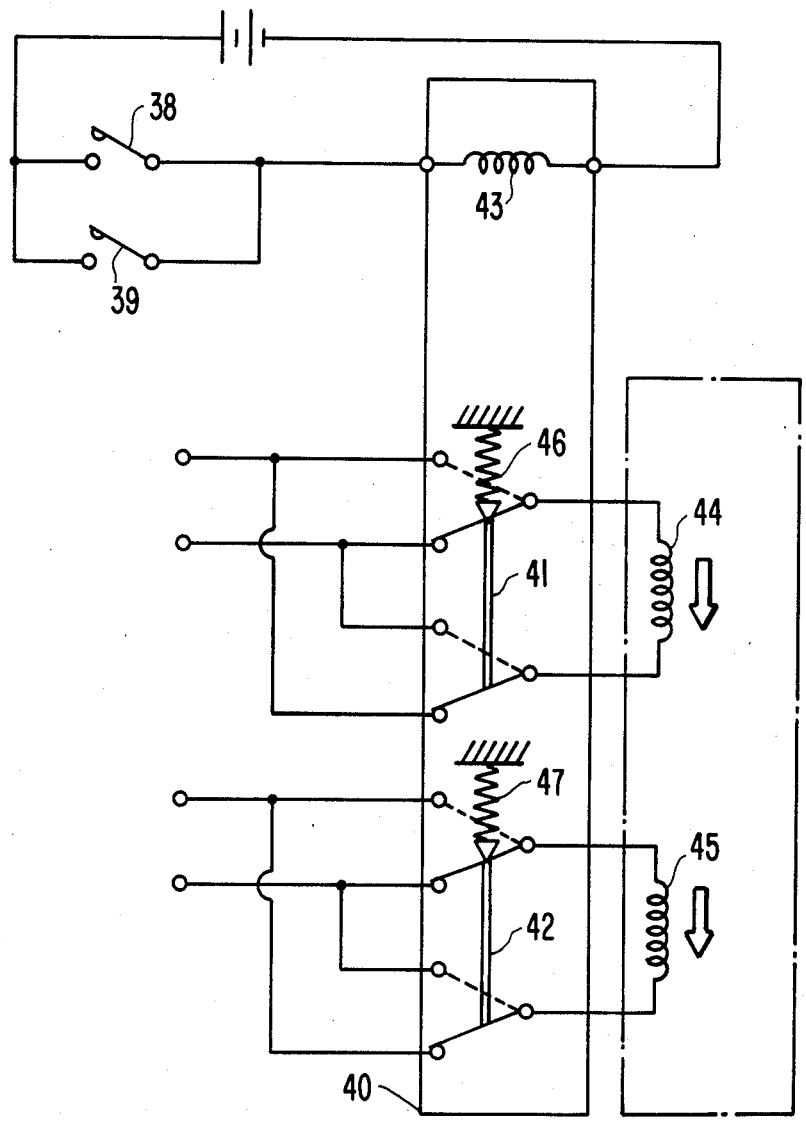
FIG. 10 is an electric system diagram of the monitoring apparatus.

FIG. 10 represents the function of these component elements as an electrical circuit diagram. Numerals 38 and 39 are contacts of the microswitches 6a and 6b of FIG. 8, which are closed as the lens structure 31 rotates and comes to a stop at a specified position (in a horizontal direction). Numeral 40 corresponding to the relay 37 in FIG. 8, which is so designed that the contacts 41 and 42 inside the relay are switched in response to the opening-closing of the contacts 38 and 39 of the microswitches. Numeral 43 designated a magnet coil installed inside the relay, which is excited when the contact 38 or the contact 39 is closed, to make the switching of the contacts 41 and 42 for altering the direction of the deflection currents which flow in the vertical deflection circuit 44 and the horizontal deflection circuit 45. Springs indicated by 46 and 47 fix the contacts 41 and 42 when the deflection coil 43 is not excited, thereby setting specified directions of the currents flowing in the vertical and the horizontal deflection coils inside the camera tube. The vertical and the horizontal deflection circuits 44 and 45 are capable of switching in such a way that the scanning direction may be reversed both up-down and right-left. Accordingly, with the scanning directions inverted both right-left and up-down by switching the directions of flow of the currents in both deflection circuits 44 and 45, the switching is made such that the picture image before being codified into signals is inverted from the former to the latter both up-down and right-left.

Figure 11A:
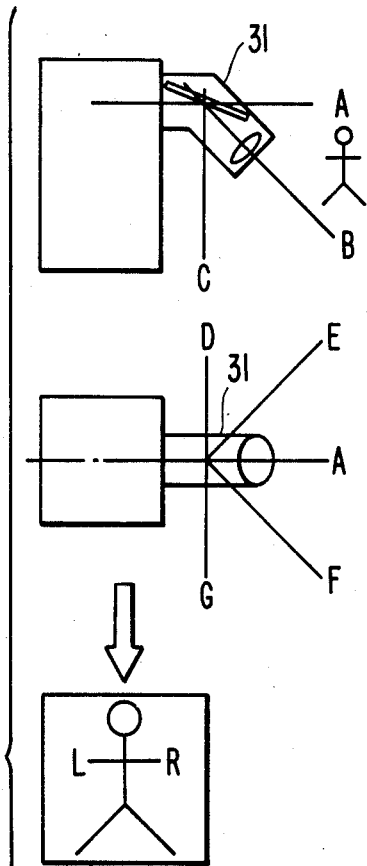
FIGS. 11(a) and 11(b) show operational relationships between respective parts of the monitoring apparatus.
Figure 11A:
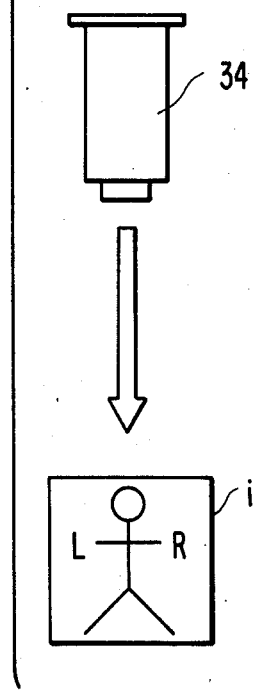
Figure 11B:
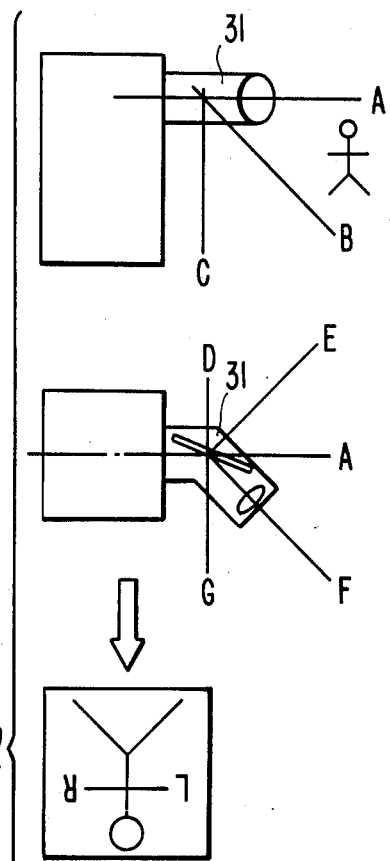
Figure 11B:
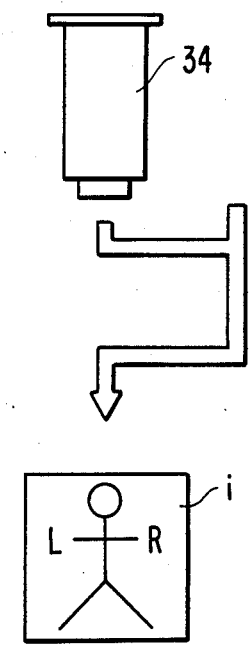

FIGS. 11(a) and 11(b) show the action obtained through application of this invention. Thus a process is added in which the light rays coming into the camera tube 34 are codified into picture image signals and, then, they are turned into picture images on a display screen. The uppermost diagrams in FIGS. 11(a) and 11(b) represent side views of the camera respectively. Below those in order are diagrams representing top views of the camera, states in which incident light rays form images on the image pick-up surface, the camera tube and picture images displayed on the display means.

In the following, the operation of an embodiment of this invention is described with reference to FIGS. 10 and 11(a) and 11(b):

Now, referring to FIGS. 11(a) and 11(b), the first optical axis of the lens structure 31 is in the direction of B and the switching arrangement is such that the image formed on the camera image pick-up surface of the camera tube 34 and the picture image on the display i is a correct image, as shown. Subsequently, the lens structure 31 is turned 90 degrees by means of a drive j such as a motor 32, etc., installed inside the camera, whereby the first optical axis is turned to the direction of F, as shown in FIG. 11(b). At this point, referring to FIG. 8, the microswitch 36a or 36b is pressed by an arm engaged with the rotary mechanism b of the lens structure 31. Then, referring to FIGS. 9–10, the contact 38 or 39 of the microswitches is closed and consequently, the deflection coil 43 inside the relay 40 is excited, whereby the contacts 44 and 45 inside the camera tube 34 are reversed. By this action, even if the image formed on the image pick-up surface of the camera tube is inverted both up-down and right-left, the scanning inside the camera tube 34 is reversed, so that the picture image when formed on the display screen by means of the picture image signals sent out therefrom is a correct image.

As hereabove described, according to the embodiments of this invention, even when an inverted image is naturally produced, a correct image may be obtained even after turning of the lens structure by 90 degrees.

Although in the aforementioned embodiments, the correct image can be obtained, only when the picture image is inversely turned by 180 degrees, the correct image may always be produced from any arbitrary direction of the first optical axis of the lens structure by altering the settings of the position detecting device and the control means.

While the lens structure is rotating, the picture image on the display is put out, rotation is stopped at a specified position to view the desired picture image only, and the picture image is formed in its correct posture.

What is claimed is:

1. A monitoring apparatus comprising:
   a housing;
   a lens structure rotatably mounted to said housing for transmitting a monitored image, said lens structure comprising a rotatable support means rotatably mounted to said housing about an axis of rotation, a first lens means fixed to one end of said rotatable support means and through which the monitored image initially passes along a first optical axis of said first lens means, and a reflector element fixed to said rotatable support means adjacent said first lens means for reflecting the monitored image passing along said first optical axis through said first lens means along said axis of rotation;
   a drive means mounted to said housing and operatively connected to said rotatable support means of said lens structure for rotating said lens structure about said axis of rotation;
   a camera element for receiving the monitored image transmitted by said lens structure after it is reflected along said axis of rotation by said reflector element;
   an electronic circuit means operatively connected to said camera element for converting said monitored image received by said camera element into image signals which correspond to a correct upright image of said monitored image;
   position detecting means operatively connected to said rotatable lens structure for detecting the rotational position of said lens structure and issuing a position signal indicative of said rotational position; and
   control means operatively connected between said position detecting means and said electronic circuit means for receiving said position signal to establish a converting mode for said electronic circuit means such that said electronic circuit means issues said image signals which correspond to a correct upright image of said monitored image based on said position signal received from said position detecting means.

2. A monitoring apparatus as claimed in claim 1 wherein,
   said electronic circuit means comprises a horizontal deflection circuit for transmitting image signals based on a horizontal scan of said monitored image received by said camera element and a vertical deflection circuit for transmitting image signals based on a vertical scan of said monitored image received by said camera element; and
   said control means comprises means for reversing the current flow in said horizontal and vertical deflection circuits based on said position signal received from said position detecting means.

* * * * *